United States Patent [19]

Honda et al.

[11] Patent Number: 5,586,093
[45] Date of Patent: Dec. 17, 1996

[54] RECORDING DEVICE CAPABLE OF READING OUT DATA FROM A DISK FOR EDITING AND RECORDING BACK TO THE DISK

[75] Inventors: Kazuhiko Honda; Kazushi Watanabe, both of Hamamatsu, Japan

[73] Assignee: Yamaha Corporation, Hamamatsu, Japan

[21] Appl. No.: 496,874

[22] Filed: Jun. 30, 1995

[30]  Foreign Application Priority Data

Jul. 1, 1994 [JP] Japan .................................. 6-173437

[51] Int. Cl.$^6$ .............................. G11B 17/22; G11B 27/00
[52] U.S. Cl. ................................. 369/32; 369/83; 369/54
[58] Field of Search .................................. 369/32, 13, 47, 369/48, 54, 83, 33; 360/8, 13, 15

[56]  References Cited

U.S. PATENT DOCUMENTS

| | | | |
|---|---|---|---|
| 5,214,631 | 5/1993 | Maeda et al. | 369/59 |
| 5,224,087 | 6/1993 | Maeda et al. | 369/54 |
| 5,243,588 | 9/1993 | Maeda et al. | 369/54 |
| 5,343,452 | 8/1994 | Maeda et al. | 369/32 |
| 5,418,762 | 5/1995 | Kitayama | 369/13 |

*Primary Examiner*—Tan Dinh
*Attorney, Agent, or Firm*—Loeb & Loeb LLP

[57]  ABSTRACT

In the editing mode where data is read out from a disk for a desired editing process and the thus-edited data is recorded back onto the disk, the data readout from and recording onto the disk are performed alternately. At storage locations of a memory previously occupied by data read out and supplied for reproduction, there are sequentially stored compressed data to be recorded that have been obtained from editing the read-out data. Data readout from the disk is performed until the data stored unread in the memory reaches a predetermined amount. When the data amount in the memory has reached the predetermined amount, the data are read out from the memory and recorded onto the disk by a predetermined unit amount.

4 Claims, 8 Drawing Sheets

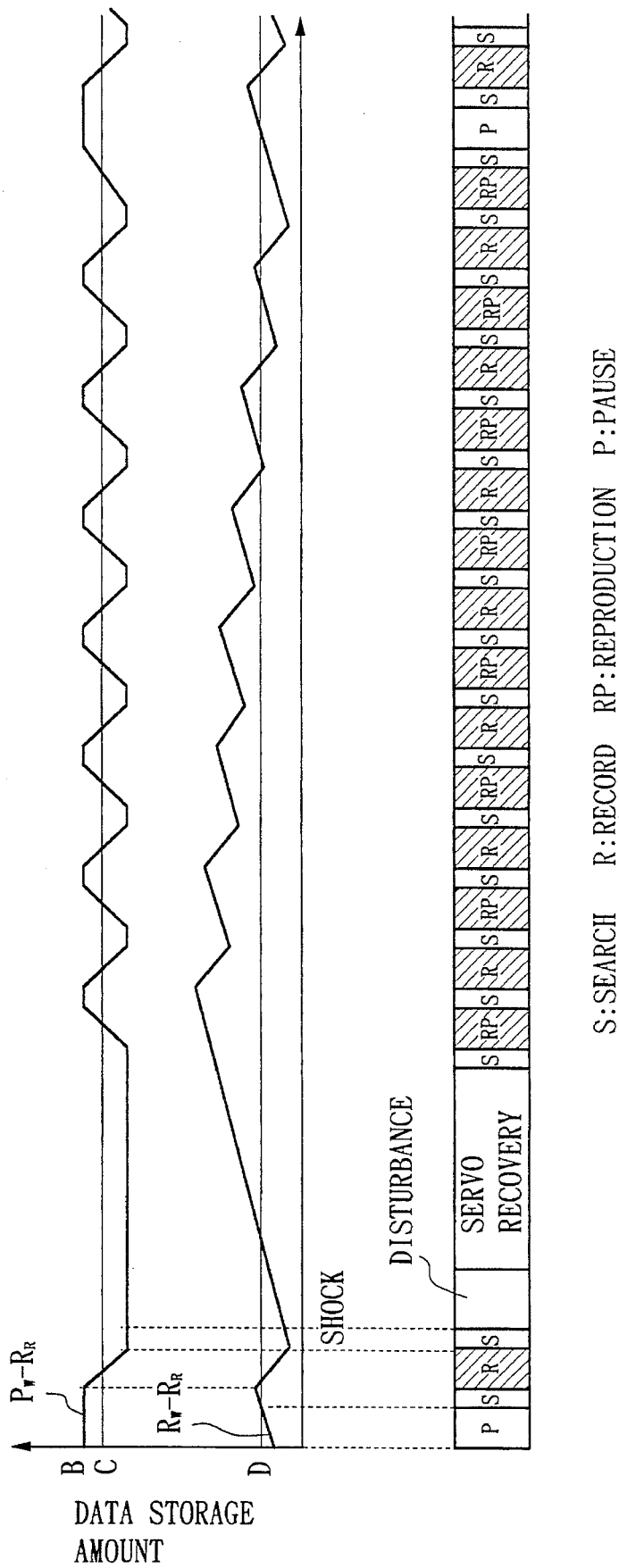

RECORDING DEVICE CAPABLE OF READING OUT DATA FROM A DISK FOR EDITING AND RECORDING BACK TO THE DISK

BACKGROUND OF THE INVENTION

This invention relates to devices for recording and reproducing information by use of a small-size optical magnetic disk such as a mini disk or the like.

Disk recording and reproducing devices have been known which record and reproduce information using a mini disk as a recording medium. The mini disk commonly known as MD, which is based on a novel sound compression/expansion technique as well as a known sampling technique as employed in a conventional Compact Disc (CD), provides as high sound quality as does the Compact Disc, requiring only about one-fifth of information amount normally required by the CD.

Since the recordable and reproducible mini disk is an optical magnetic disk, a device for recording and reproducing information onto and from such a mini disk ("MD player") is provided with a recording/reproducing optical head and a magnetic head that is used in combination with the optical head in recording desired information on the disk. For normal operation of the device, a user selects either a reproduction mode to reproduce data from the disk or a recording mode to write data onto the disk.

In the reproduction mode, data recorded in compressed form on the disk are intermittently read out from the disk to be intermittently written into a buffer memory at a rate of, say, 1.4 Mb/s, during which time the thus-written data are successively read out from the buffer memory at a rate of, say, 0.3 Mb/s and subjected to a data expansion process. The resultant expanded data are then output as reproduced data signals.

In the recording mode, data signals to be recorded are compressed and successively written into the buffer memory at a rate of, say, 0.3 Mb/s, during which time the thus-written data are intermittently read out from the buffer memory at a rate of, say, 1.4 Mb/s to be recorded onto the disk in an intermittent manner.

Even when there has been caused deviation in the disk tracking servo due to an external disturbance, the above-mentioned buffer memory functions to successively allow the reproduced data signals to be output therefrom and allow the data signal to be recorded to be input thereto until all the data stored in the memory have been completely read out (hereinafter, this function will be called a "shockproof function").

Recorded music data, for example, are sometimes processed for desired editing while being reproduced. In such a case, an editing mode has to be set which provides combined functions of the recording and reproduction modes. Among various expected editing functions may be an overdubbing function for re-recording in real time already-recorded data after mixing new music data to part of the data while the latter is reproduced, a so-called ping-pong recording function for re-recording in real time a plurality of already-recorded data after reproducing and mixing together the plurality of data, a punch-in/punch-out function for changing part of already-stored data into new music data, etc.

However, in realizing the above-mentioned editing mode with the conventional disk recording and reproducing devices, the reproduction and recording systems of the devices would require separate buffer memories and memory controllers for the simultaneous reproduction and recording operations, thus resulting in complicated construction.

SUMMARY OF THE INVENTION

Therefore, it is an object of the present invention to provide a disk recording and reproducing device which is capable of simultaneously performing reproduction and recording in real time by use of a single storage means, It is another object of the present invention to provide a disk recording and reproducing device which is capable of simultaneously performing reproduction and recording in real time by use of a single storage means and which also has a shockproof function.

In order to accomplish the above-mentioned objects, the present invention provides a disk recording and reproducing device which comprises a single storage section, a reproduction section for reading out data recorded in compressed form on a recordable disk and intermittently writing the read-out data into the storage section as disk readout data at a first rate, during which time the reproduction section successively reads out the disk readout data written in the storage section at a second rate lower than the first rate, expands the readout disk readout data and then outputs the expanded disk readout data as reproduced data signal, a recording section for compressing data to be recorded and successively writing the compressed data into the storage section at the second rate, during which time the recording section intermittently reads out the compressed data written in the storage section to record the read-out compressed data onto the disk, and a control section for executing an editing mode to allow the recording section to record the compressed data onto the disk while causing the reproduction section to read out the data from the disk. The control section alternately allows the reproduction section to read out the data from the disk and the recording section to record the compressed data onto the disk by shared use of the storage section between the reproduction section and recording section, in such a manner that data to be supplied for reproduction and data to be supplied for recording coexist in the storage section. The control section also performs control to cause the compressed data to be sequentially stored at storage locations previously occupied by the data having been read out from the storage section and supplied for reproduction. When the data stored unread in the storage section are less than a predetermined amount, the control section preferentially allows the reproduction section to read out the data from the disk until the unread data in the storage section reaches the predetermined amount, whereas when the data stored unread in the storage section has reached the predetermined amount, the control section controls the recording section to record the data to be recorded onto the disk by a predetermined unit amount.

When access to the disk becomes impossible, the control section suspends both writing of the disk readout data into the storage section and reading-out of the compressed data from the storage section so as to continue reading-out of the data from the storage section and writing of the compressed data into the storage section and also performs a recovery operation to permit access to the disk. After access to the disk becomes possible, the control section resumes the writing of the disk readout data into the storage section and the reading-out of the compressed data from the storage section.

According to the present invention, in the editing mode where data are read out from the disk for a desired editing process and the thus-edited data are recorded back onto the disk, the data readout and recording operations from and onto the disk are performed in an alternate manner. At storage locations of the storage section previously occupied by the data having been read out and supplied for reproduction, there are sequentially stored the compressed data to be recorded. Because the data readout from the storage section and the data writing into the storage section are both performed at the second rate, the two data will not interfere with each other in the storage section. This permits an efficient use of any empty area in the storage section, and hence even a single storage section of small capacity can appropriately be shared between the reproduction and recording sections.

Further, in the editing mode, when the data stored unread in the storage section are less than a predetermined amount, the control section preferentially allows the reproduction section to read out the data from the disk, so that the data to be reproduced are stored in the storage section in greater amount than the data to be recorded. Thus, when there has been applied an external shock, it is allowed to make longer the duration of the operation in which the data to be reproduced are successively read out to sequentially replace the data to be recorded, thereby providing a sufficient time for recovery from the external shock.

For better understanding of other objects and advantages of the present invention, the preferred embodiment of the invention will be described in detail below with reference to the accompanying drawings.

BRIEF DESCRIPTION OF THE INVENTION

In the drawings:

FIG. 8 is also a diagram explanatory of shockproof operations performed by the MD player in the editing mode.

DETAILED DESCRIPTION OF THE PREFERRED EMBODIMENT

Figure 1:
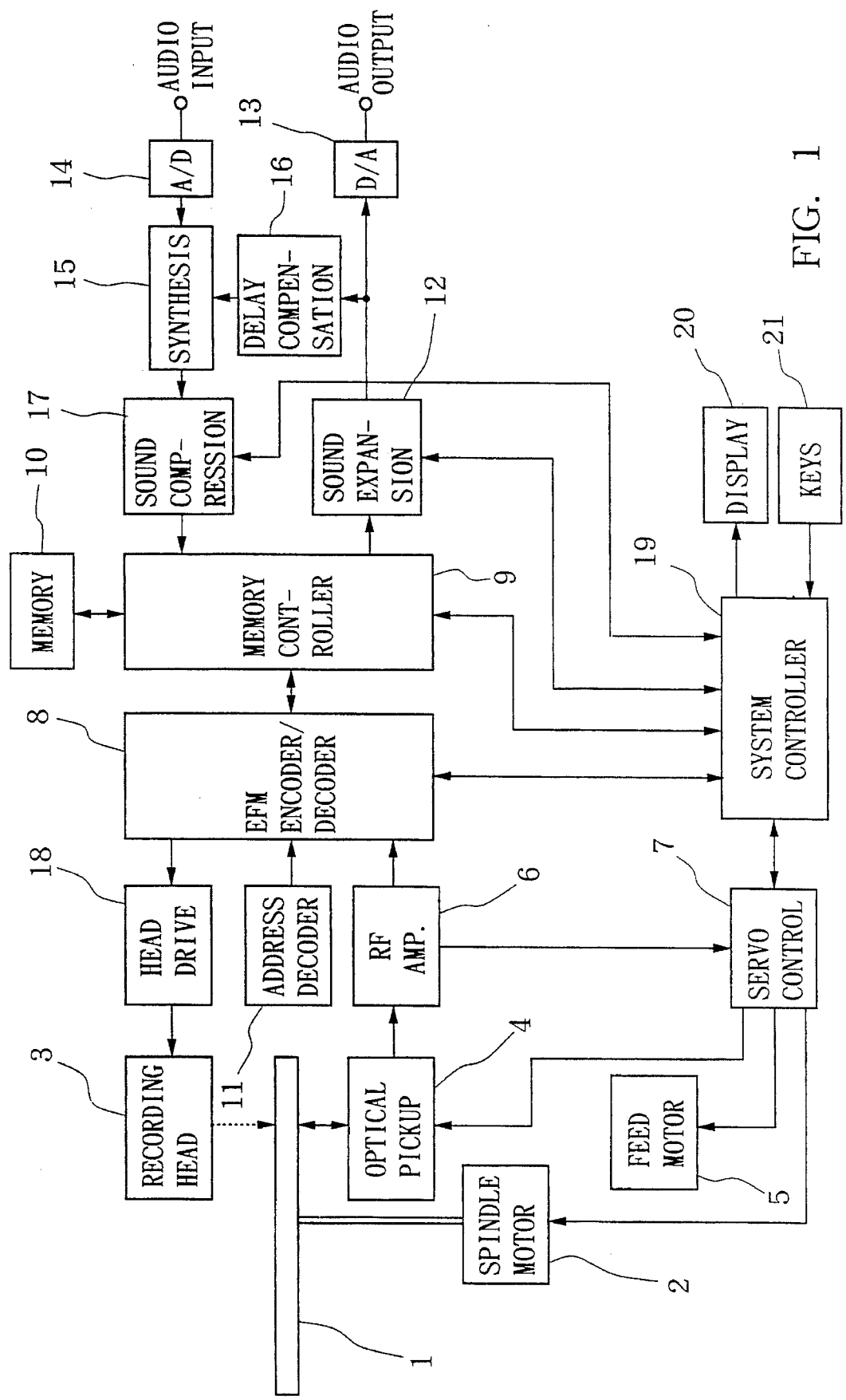
FIG. 1 is a block diagram illustrating the general arrangement of an MD (mini disk) player in accordance with an embodiment of the present invention.

FIG. 1 is a block diagram illustrating the general arrangement of an MD player in accordance with an embodiment of the present invention.

An MD type disk 1 is a recordable/reproducible optical magnetic disk, which is driven for rotation by a spindle motor 2 typically at a constant linear velocity. A magnetic recording head 8 and an optical pickup 4 are provided above and below the mini disk 1, respectively. The magnetic recording head 3 applies a magnetic field to the disk 1 to write information thereon, and the optical pickup 4 has functions of optically reading information from the disk 1 and of writing information onto the disk 1 in cooperation with the magnetic recording head 3. The optical pickup 4 is movable, by means of a feed motor 5, along the radius of the the disk 1. The output from the optical pickup 4 is amplified by a high-frequency (RF) amplifier and then supplied to a servo control section 7. On the basis of the output from the optical pickup 4, the servo control section 7 controls the rotating and feeding drive operations of the spindle motor 2 and feed motor 5 and performs focus/tracking control of the pickup 4.

The reproduction system of the MD player 1 is constructed as follows. The output signal from the RF amplifier 6 is also supplied to an EFM (Eight-to-fourteen Modulation) encoder/decoder 8, which in turn decodes the output signal from the RF amplifier 6 in accordance with an error correcting technique based on ACIRC (Advanced Cross Interleave Reed-solomon Code) and demodulates the 14-bit data back to 8-bit data. The thus decoded and demodulated data is then stored into a buffer memory 10 under the control of a memory controller 9. A readout address to be used for the purpose is given by an address decoder 11 decoding the output from the RF amplifier 6. The data stored in the memory 10 is read out by the memory controller 9, converted into expanded form by a sound expansion section 12, converted into analog representation by a D/A converter 13 and then output as a reproduced audio output data signal.

On the other hand, the recording system of the MD player 1 is constructed as follows. An audio input data signal to be recorded is supplied to a synthesis section 15 after having been converted into digital representation by an A/D converter 14. To the synthesis section 15 is also supplied to the output signal from the sound expansion section 12 after its time delay having been compensated for by a delay compensation section 16. The synthesis section 15 edits these supplied signals as necessary by, for example, synthetically processing the signals and supplies the resultant processed signal to a sound compression section 17. The data supplied from the synthesis section 15 is compressed by the compression section 17 and then stored in the memory 10 under the control of the memory controller 9. The data to be recorded thus stored in the memory 10 is fed onto the EFM encoder/decoder 8 under the control of the memory controller 9, and supplied to a head drive 18 after having been subjected to EFM modulation and ACIRC-based coding. The recording head 3 is driven by the head drive 18 to record necessary data onto the disk 1.

In addition to the above-mentioned components, the MD player includes a system controller 19 for controlling the entire device, a display 20 for visually presenting various information, and a plurality of operation keys 21 for operation by the user to designate any of reproduction mode, recording mode and editing mode, etc. and to also give various instructions to the MD player.

In the MD player thus constructed, the sound compression is performed in the sound compression section 17 in such a manner to remove unnecessary data by use of human auditory properties. For example, a compression technique known as ATRAC (Adaptive Transform Acoustic Coding) achieves compression up to about one-fifth of the original information amount. Since the data recorded onto the disk 1 are in compressed form as noted above, access to the disk 1 in relation to the successively supplied data signals to be recorded and successively output reproduced data signals becomes intermittent. For this reason, the MD player is provided with the buffer memory 10 to provide timing adjustment between the two data signals, and it is this buffer memory 10 that performs the shockproof function.

Now, the characteristic operation of the device will be described. First, a description will be made on normal reproduction and recording operations that are performed independently of each other.

Figure 2:
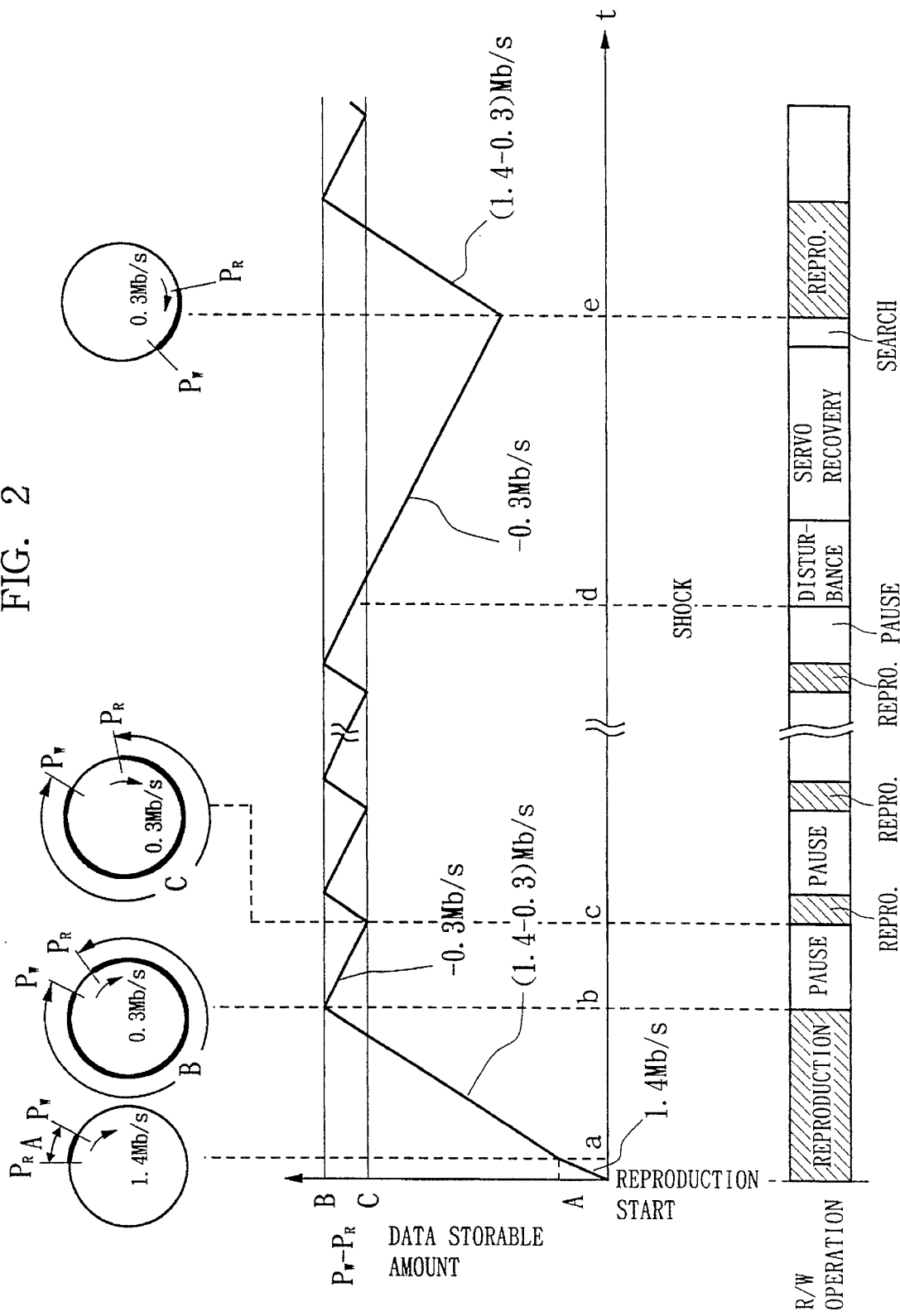
FIG. 2 is a diagram explanatory of a manner in which the MD player operates in the reproduction mode.

FIG. 2 is a diagram explanatory of the state of the buffer memory 10 and the accessed state of the disk 1 in the reproduction mode. Circles in the uppermost portion of the figure show the varying state of the buffer memory 10 functioning as a ring buffer, in which a heavy solid line denotes an area of the memory 10 where data are temporarily stored and a light solid line denotes an empty area of the memory 10. Further, reference character PW denotes a pointer for writing readout data into the memory 10, and PR denotes a pointer for reading-out the data from the memory 10.

In the illustrated example of FIG. 2, upon activation of the reproduction mode, the memory controller 9 starts successively storing the output data from the EFM encoder/decoder into the buffer memory 10 as disk readout data at a data transfer rate of about 1.4 Mb/s. Once the data storage amount in the memory 10 has exceeded predetermined value A (point a), the data are successively read out from the memory 10 at a data transfer rate of about 0.3 Mb/s, and data transfer to the sound expansion section 12 is initiated. Thereafter, the data storage amount in the buffer memory 10 increases at a storage rate of (1.4–0.3) Mb/s. Then, once the data storage amount in the buffer memory 10 has exceeded predetermined value B close to the entire capacity value of the memory 10 (point b), the data storage into the memory 10 is suspended, and the read/write action relative to the disk 1 is put to a pause state. Because the data readout from the buffer memory 10 continues even in this pause state, the storage amount in the memory 10 decreases at a rate of 0.3 Mb/s. Then, once the data storage amount in the buffer memory 10 has fallen below predetermined value C smaller than value B (point c), the optical pickup 4 having so far been in the pause state resumes its read/write operation so that storage into the memory 10 of the EFM encoder/decoder output is started again. Intermittent data readout and successive data reproduction are carried out by repeating a series of the above-mentioned operations.

When the tracking and focus servo control of the optical pickup 4, etc. have deviated due to an external shock applied in the course of the reproduction (point d), the address decoder 11 may become unable to read addresses. The system controller 19 detects this disorder and executes a servo recovery operation as will be described. Because the data storage into the buffer memory 10 is suspended during the servo recovery operation, only the data transfer from the memory 10 to the sound expansion section 12 takes place, so that the data storage amount in the memory 10 decreases at a rate of 0.3 Mb/s. Upon termination of the servo recovery operation, the system controller 19 searches for such an address area on the disk 1 which could not be reproduced due to the external shock and resumes the data reproduction at the head of the searched-out address area (point e). Thus, even when the data readout from the disk 1 temporarily fails, incessant data supply from the buffer memory 10 to the sound expansion section 12 is guaranteed until the memory 10 runs out of data to be supplied, and hence reproductive sounds are generated in a normal manner. After the servo recovery, the data storage into the memory 10 is continued until the data storage amount in the buffer memory 10 reaches value B.

Figure 3:
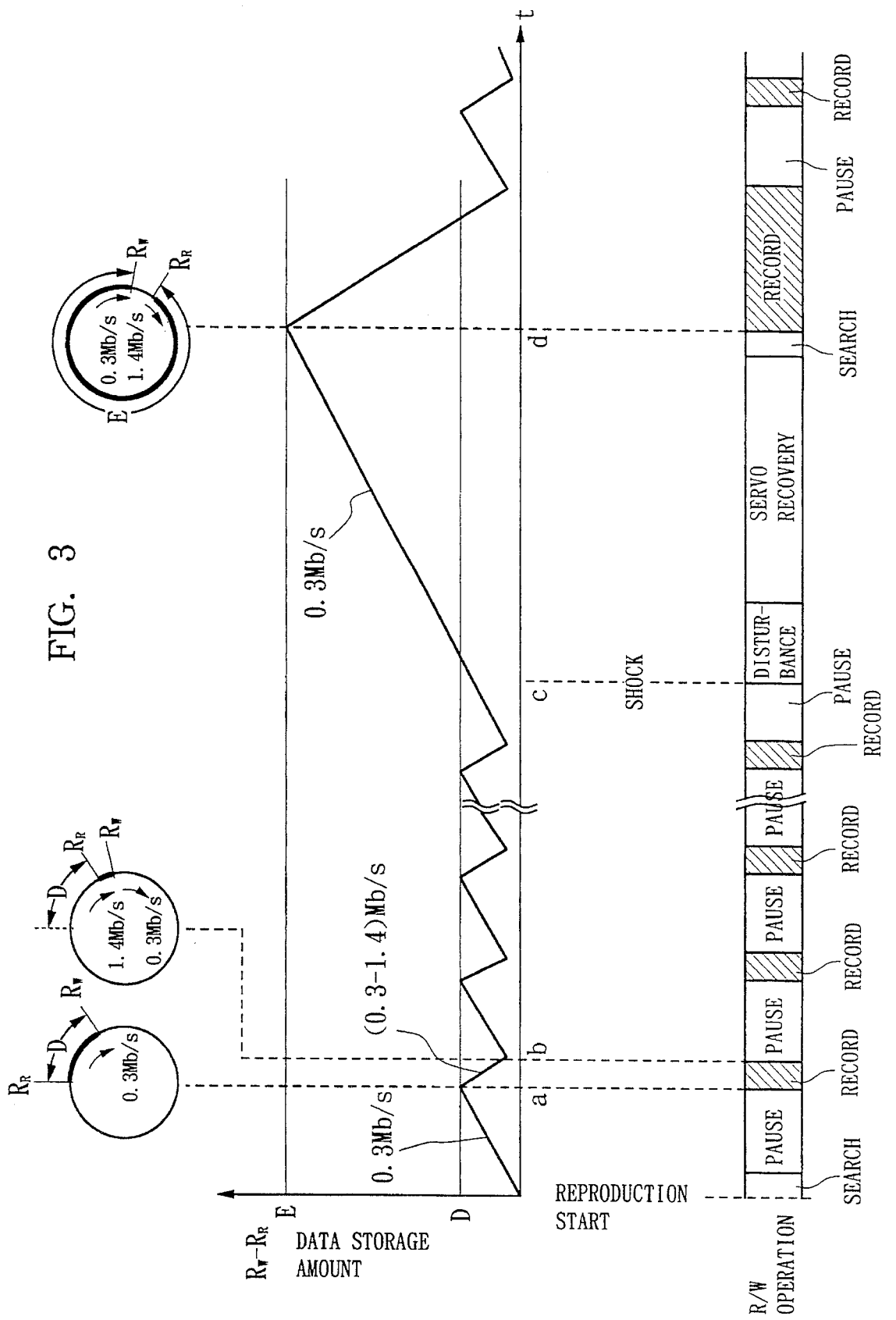
FIG. 3 is a diagram explanatory of a manner in which the MD player operates in the recording mode.

FIG. 3 is a diagram explanatory of the state of the buffer memory 1 and the accessed state of the disk 1 in the recording mode, in which reference character RW denotes a pointer for writing data to be recorded into the memory 10, and RR denotes a pointer for reading out the data from the memory 10.

The control performed in the recording mode is generally the opposite of that in the reproduction mode. That is, in this mode, the data writing into the buffer memory 10 is performed at a rate of about 0.3 Mb/s and the data readout from the memory 10 is performed at a rate of about 1.4 Mb/s, so that the data storage amount in the memory 10 is controlled to be minimized.

Upon activation of the recording mode, the memory controller 9 first starts successively storing the output data from the sound compression section 17 into the buffer memory 10 at a transfer rate of 0.3 Mb/s. In the meantime, the optical pickup 4 searches for the head of a recording area on the disk under the control of the system controller 19 and is then placed in the pause state. Once the data storage amount in the buffer memory 10 has exceeded a predetermined unit amount D (for example, one cluster of data corresponding to a minimum unit for recording onto the disk 1) (point a), the memory controller 9 reads out the data from the memory 10 at a data transfer rate of about 1.4 Mb/s and supplies the read-out data to the EFM encoder/decoder 8. Thus, the data recording onto the disk 1 is started. When recording of predetermined unit amount D of the data has been completed, the optical pickup 4 is placed in the pause state. Because the data from the sound compression section 17 continue to be stored even during the recording, the data storage into the memory 10 during the recording is at a rate of (0.3–1.4) Mb/s.

When the tracking and focus servo control of the optical pickup 4, etc. have deviated due to an external shock in the course of the recording (point c), the address decoder 11 may become unable to read addresses on the disk 1. The system controller 19 detects this disorder and executes the servo recovery operation. The data storage from the buffer memory 10 into the EFM encoder/decoder 8 is suspended during the servo recovery operation, and hence the data storage amount in the memory 10 increases at a rate of 0.3 Mb/s by virtue of the continuing data storage from the sound compression section 17 into the memory 10. Upon termination of the servo recovery operation, the system controller 19 searches for such an address area on the disk 1 which could not be reproduced due to the external shock and resumes the data recording at the head of the searched out address area (point d). Thus, even when the data readout from the disk 1 temporarily fails, incessant data supply from the sound compression section 17 to the buffer memory 10 is guaranteed until the data storage amount in the memory 10 reaches its full capacity, so that data signals to be recorded will never be exhausted. After the servo recovery, recording of data in an amount corresponding to an integral multiple of the predetermined unit amount D is successively carried out until the storage amount in the buffer memory 10 falls below the unit amount D.

The following is an explanation on operations where the reproduction and recording are executed simultaneously in a parallel fashion, for example, in the editing mode.

The 1.4 Mb/s bit rate of the data to be read out from the disk 1 and the 0.3 Mb/s bit rate in outputting the read-out data as reproduced data signal are at a ratio of about 5:1, in the reproduction mode. Accordingly, the pause time shown in FIG. 2 amounts to about four-fifths of the entire time length of the reproduction mode. Similarly, in the recording mode, the 0.3 Mb/s bit rate of compressed data to be recorded and the 1.4 Mb/s bit rate in recording the compressed data onto the disk 1 are at a ratio of about 1:5, and hence, the pause time amounts to about four-fifths of the entire time length of the recording mode. Therefore, the recording and reproduction can be performed in an alternate manner by alternately accessing the disk 1 utilizing the respective pause times.

Such reproduction and recording are performed simultaneously in a parallel fashion in the editing mode. Thus, in the editing mode, it is allowed to perform an overdubbing function for re-recording in real time already-recorded data after mixing new music data to part of the data while the latter is reproduced, a so-called ping-pong recording function for re-recording in real time a plurality of already-recorded data after reproducing and mixing together the plurality of data, a punch-in/punch-out function for changing part of already-stored data into new music data, etc. The synthesis circuit 15 functions to synthesize signals for such purposes, and it comprises a multiplier for multiplying the output from the A/D converter 14 by the output from the delay compensation section 16, a coefficient circuit for adjusting the gain of the input data to the multiplier. The above-mentioned various editing processes can be implemented by the coefficient circuit varying the synthesis ratio between the signals applied along the two routes.

Figure 4:
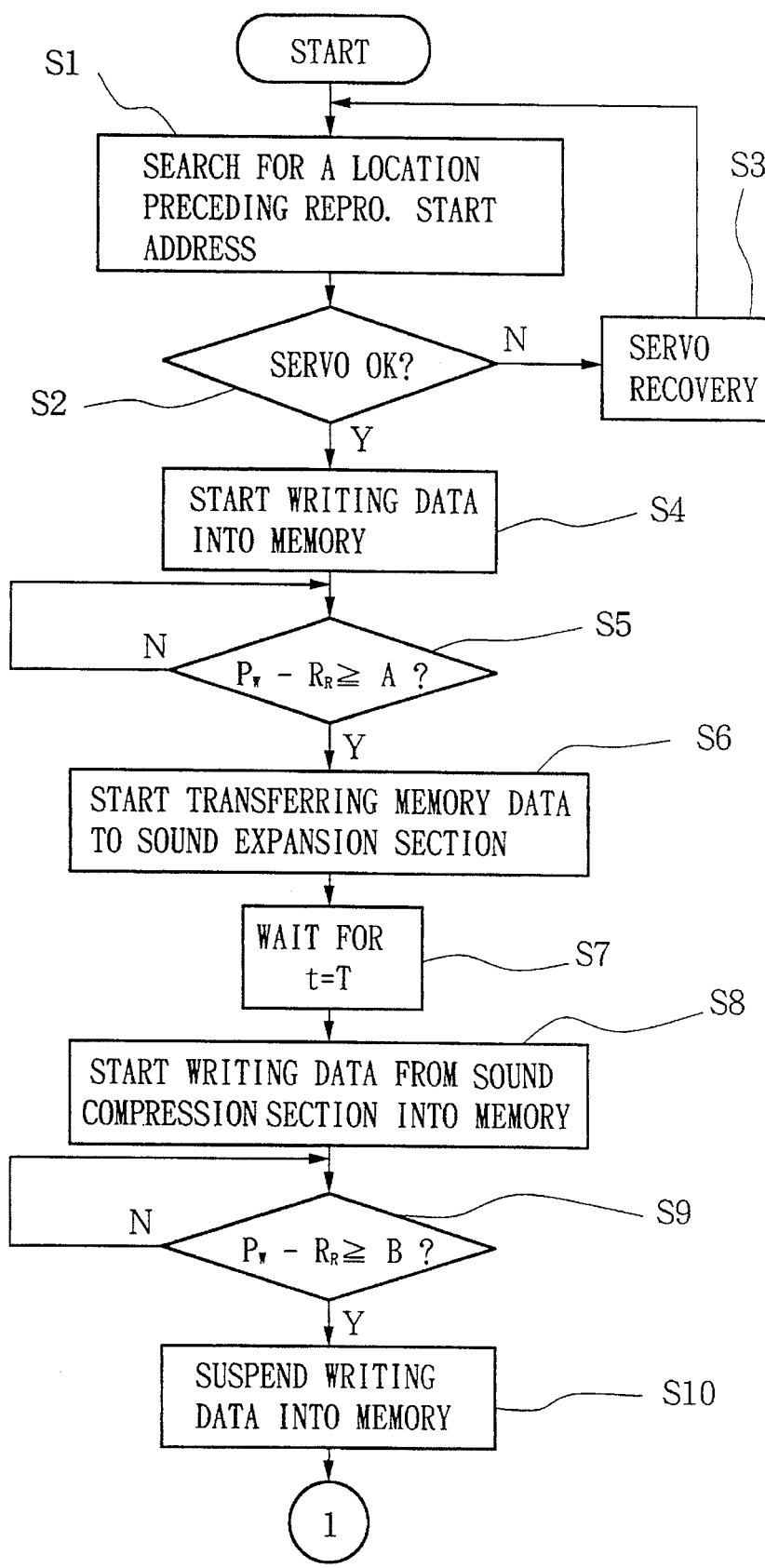
FIG. 4 is a flowchart illustrating a part of operations performed by the MD player in the editing mode.
Figure 5:
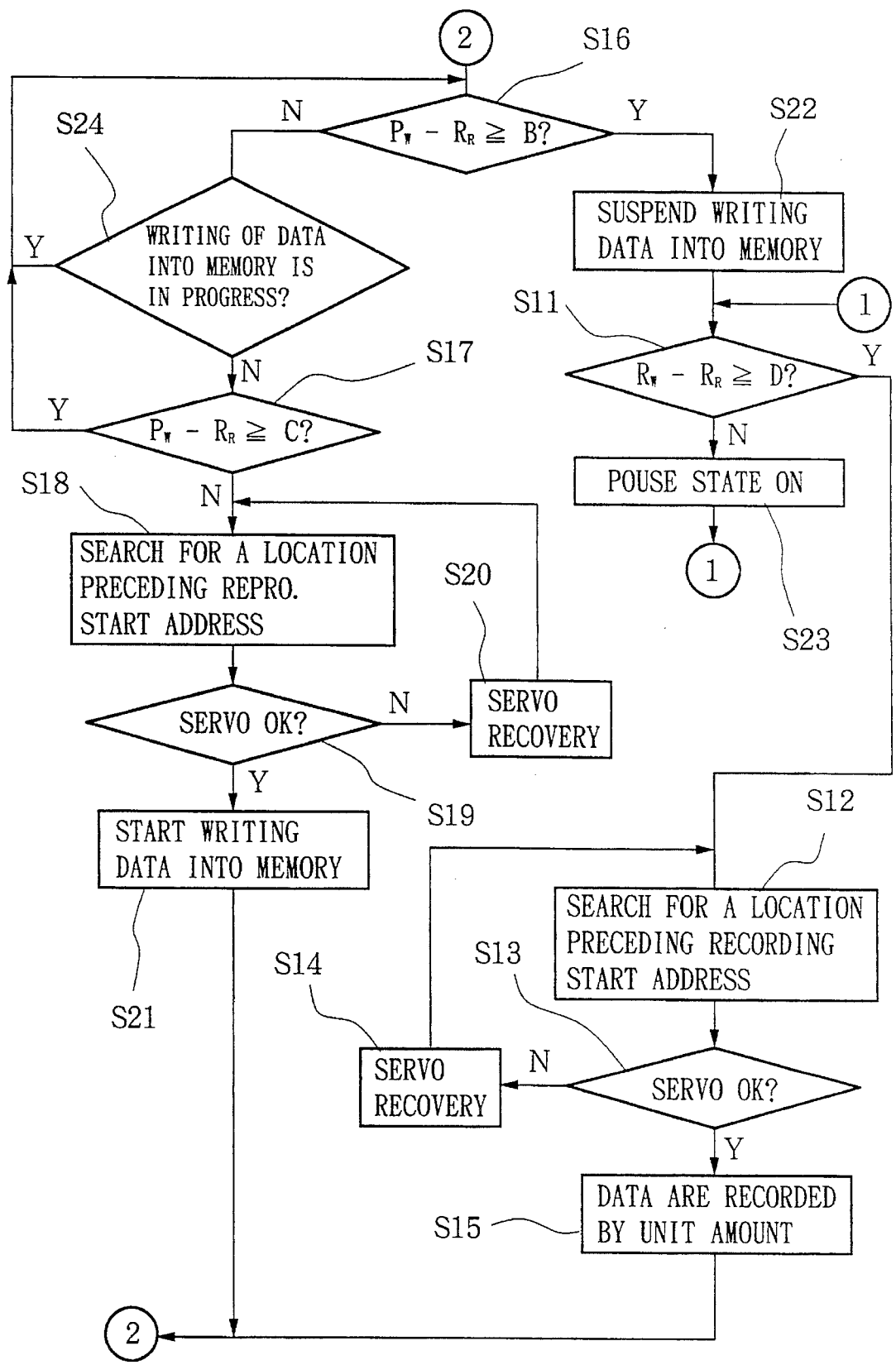
FIG. 5 is a flowchart illustrating the remaining part of the operations of FIG. 4.

FIGS. 4 and 5 is a flowchart illustrating a sequence of processing which is performed by the memory controller 9 and system controller 19 so as to execute the editing mode where the buffer memory 10 is shared between the reproduction and recording operations.

In the editing mode, the reproduction control for storing the output from the EFM encoder/decoder 8 in the memory 10 is given priority over the recording control for transferring the edited data from the memory 10 to the EFM encoder/decoder 8 for recording onto the disk 1. The recording operation is performed with reference to the pointers PR, Pw, RR, Rw in such a manner that it is triggered when the data amount (Rw–RR) has been stored in the memory 10 up to the predetermined unit amount D under the condition that the data amount (Pw–RR) is not smaller than predetermined value B close to the full capacity of the memory 10.

Figure 6:
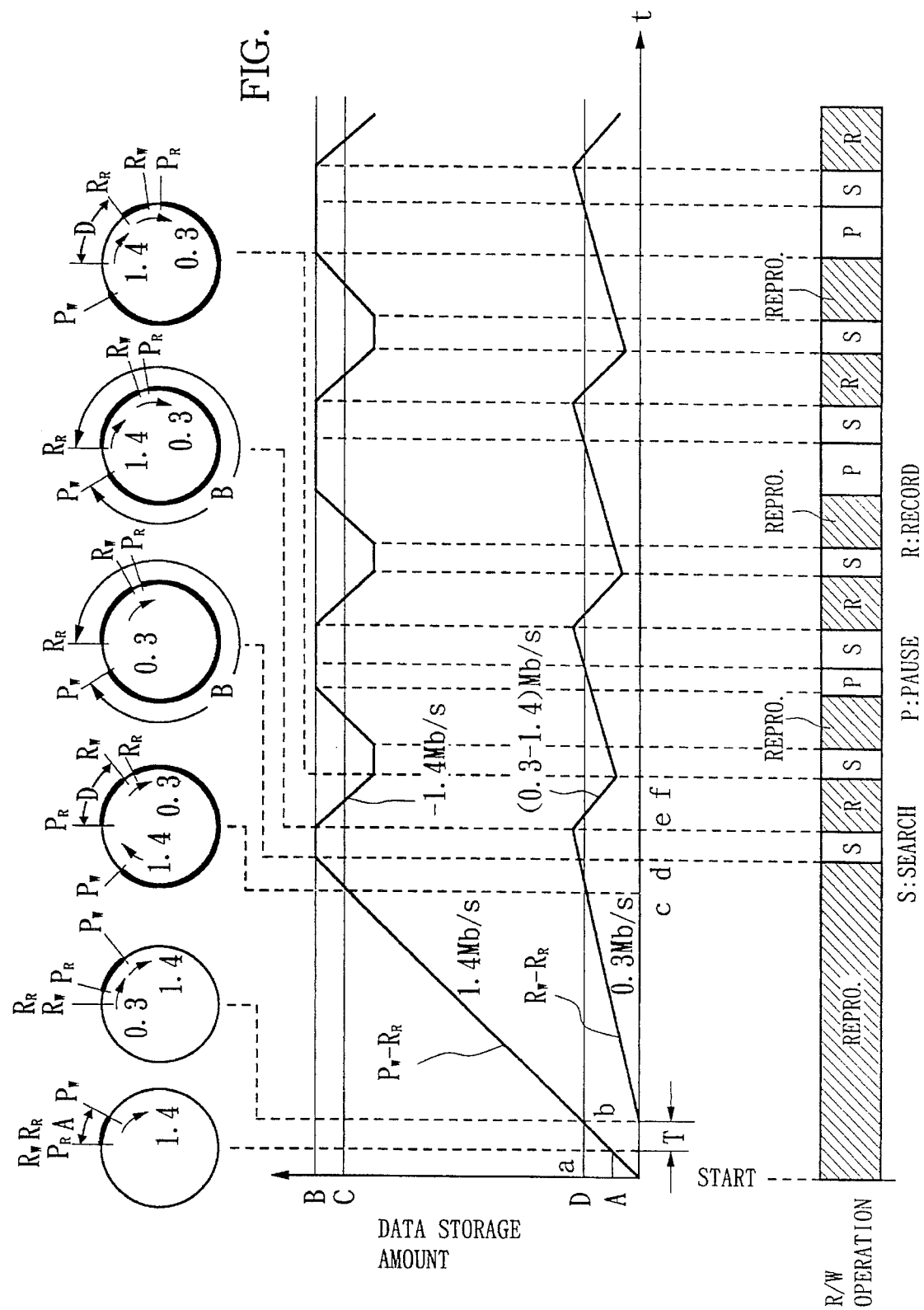
FIG. 6 is a diagram explanatory of operations performed by the MD player in the editing mode.

A detailed example of the processing in the editing mode will be described below with reference to FIGS. 4, 5 and 6. It is assumed here that pointers PR, Pw, RR and Rw associated with the buffer memory 10 all point to a same address prior to activation of the editing mode.

Upon activation of the editing mode, the memory controller 9 first starts reproduction operation (Steps S1, S2 and S3) and starts successively writing the output data from the EFM encoder 8 into the memory 10 at a data transfer rate of about 1.4 Mb/s (step S4). Once the data amount (Pw–RR) has exceeded predetermined value A at point a (step S5), data are successively read out from the buffer memory 10 and supplied to the sound expansion section 12 at a data transfer rate of about 0.3 Mb/s (step S6).

The above operations of steps S1 to S6 are similar to those in the normal reproduction mode. But, in the editing mode, after supply of the data from the memory 10 to the sound expansion section 12 is initiated, time delay resultant from the processing in the sound expansion section and A/D converter 14 or delay compensation circuit 16 is compensated for. To this end, when time T has elapsed at point b (step S7), the data to be recorded supplied from the sound compression section 17 are started being transferred to the address locations previously occupied by the reproductive data having been transferred from the memory 10 to the sound expansion section 12 time T before (step S8). That is, in consideration of the time passage before the reproductive data are output after having been edited, the data to be recorded are sequentially written, with time difference T, at the same storage locations the as reproductive data having been transferred to the memory 10, to thereby achieve an efficient use of the memory 10. During this period, the read/write relative to the disk 1 is in the reproduction operation; the reproductive data are accumulated in the memory 10 at a rate of 1.4 Mb/s; the reproduction data are read out from the memory 10 at a rate of 0.3 Mb/s, and further the data to be recorded are accumulated in the memory 10 at rate of 0.3 Mb/s. Therefore, the total data amount in the buffer memory 10 as represented by (Pw–RR) increases at a rate of 1.4 Mb/s, while the amount in the memory 10 of the data to be recorded increases at a rate of 0.3 Mb/s.

In the normal recording mode, the recording is started once the data amount (Rw–RR) has exceeded the predetermined unit amount D (point c); however, in the editing mode, the reproduction is continued until the data amount (Pw–RR) exceeds predetermined value B at point d. Upon arrival at value B of the data amount (Pw–RR) (step S9), the storage of the output data from the EFM encoder/decoder 8 is suspended in step S10. But, because the data amount (Rw–RR) has already exceeded the predetermined unit amount D by this time (step S11), a search operation is executed to move the optical pickup 4 over to a location on the disk 1 where data should be recorded (steps S12, S13 and S14). During the search, the data amount (Pw–RR) is kept constant, but the reproductive data transfer from the buffer memory 10 to the sound expansion section 12 and the storage of the data to be recorded from the sound compression section 17 into the memory 10 are still under way, so that the data amount (Rw–RR) increases at a rate of 0.3 Mb/s. That is, the percentage of the data to be recorded in the overall data storage amount in the memory 10 increases in a gradual manner.

Upon termination of the search (point e), the recording operation is activated to record the data in the predetermined unit amount D onto the disk 1 (step S15). During the recording, the data amount (Pw–RR) decreases at a rate of 1.4 Mb/s. Accordingly, at the termination of the recording (point f), the data amount (Pw–RR) is below the predetermined value C (steps S16, S17 and S24). Thus, after the recording, a search is made for a position for reproduction (steps S18, S19 and S20), and the reproduction operation is executed in step S21. Then, once the data amount (Pw–RR) has reached predetermined value B (steps S16 and S24), the reproduction operation is suspended (step S22). Then, the pause state is set ON (steps S11 and S23) since the data amount (Rw–RR) has reached the unit amount D. Upon arrival at the unit amount D, a search is made for a position for recording (steps S11, S12, S13 and S14) and data recording is performed onto the searched-out position (step S15). After that, the above-mentioned reproduction and recording operations are performed in a repeated manner.

Now, a description will be made on the shockproof function in the editing mode, with reference to FIGS. 7 and 8.

Figure 7:
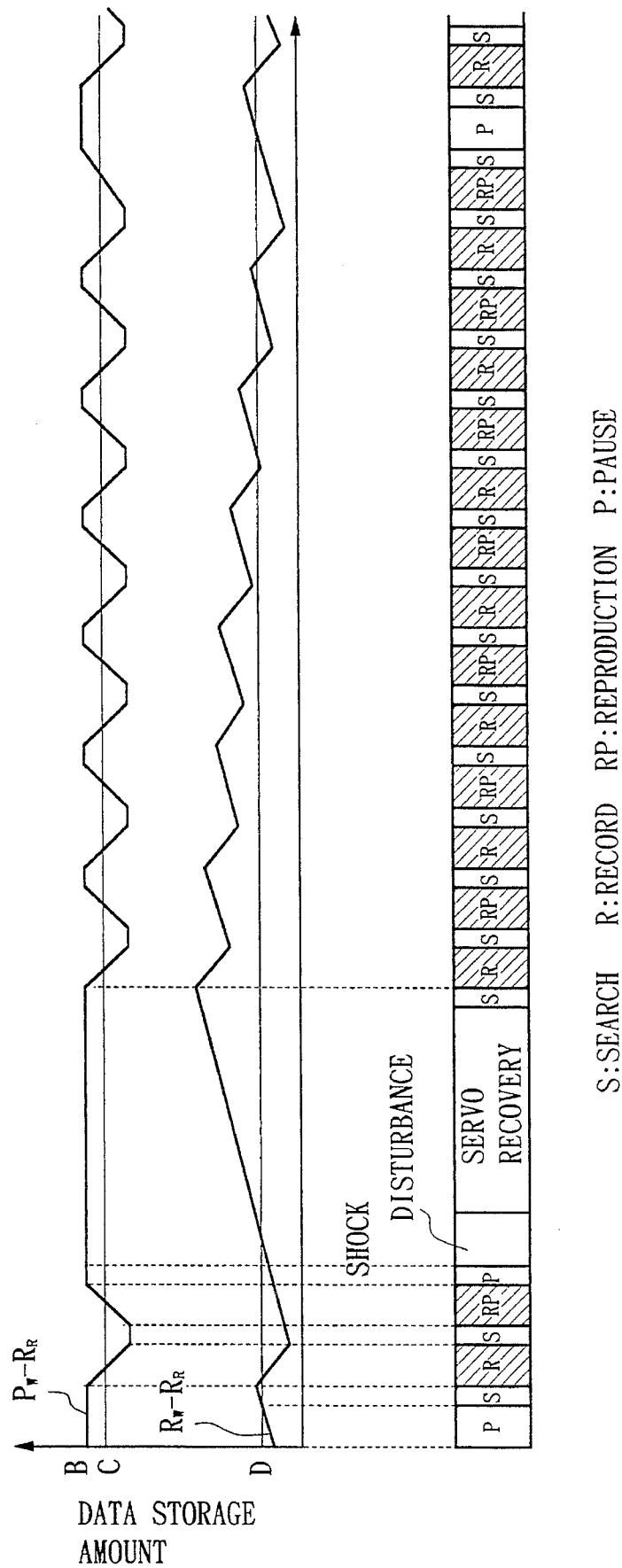
FIG. 7 is a diagram explanatory of shockproof operations performed by the MD player in the editing mode.

FIG. 7 shows how the device operates when there has been applied an external shock or disturbance in the pause state after the reproduction operation.

then the tracking and focus servo etc. has deviated and the address decoder 11 has become unable to read addresses, the system controller 19 detects this disorder (step S13) to proceed to the servo recover operation (step S14). During this servo recovery, the data amount (Pw–RR) is maintained constant, and the data amount (RW–RR) increases at a rate of 0.3 Mb/s by virtue of continuing data accumulation into the buffer memory 10. Upon completion of the servo recovery, Pw–RR≧B and RW–RR>D, and hence a search is made for a position for recording (step S12) to start recording at the searched-out recording position (step S15). After that, the data amount in the buffer memory is restored by repeating the reproduction and recording with no intervening pause operation. The covering range of the shockproof function is (PW–PR) as in the normal reproduction. Therefore, the necessary memory capacity for the embodiment including the shockproof function will be the necessary capacity for reproduction plus the predetermined unit amount D for recording.

FIG. 8 shows how the device operates when there has been an external disturbance after termination of the recording operation.

After the servo recovery, the data amount (RW–RR) is greater than the unit amount D but smaller the value C, so that the reproduction operation is first performed in steps S18, S19 and S21 and then the recording operation is performed in steps S12, S13 and S15. The subsequent operations are the same as mentioned above.

In the above-described embodiment, the sound compression section 17 and sound expansion sections 12 are provided separately and hence operable simultaneously. However, these sections 17 and 12 may be integrated into a single processing section if sound compression and expansion are made simultaneously processable by timesharing technique or the like.

The present invention, as has been so far described, is characterized in that, in the editing mode where data are read out from the disk for a desired editing process and the thus-edited data are recorded back onto the disk, the compressed data to be recorded are sequentially stored at locations of the buffer memory previously occupied by the data having been read out and supplied for reproduction. This feature permits an efficient use of any empty area in the memory, and hence even a single memory of relatively small capacity can appropriately be shared between the reproduction and recording operations.

The present invention is further characterized in that when the data stored unread in the memory are less than a predetermined amount in the editing mode, the data readout from the disk is performed with priority over the data writing into the memory until the data reaches the predetermined amount, so that the data to be reproduced are stored in the memory in greater amount than the data to be recorded. This feature makes it possible to make longer the duration of the operation in which the data to be reproduced are successively read out to sequentially replace the data to be recorded, thereby providing a sufficient time for recovery from the external shock.

What is claimed is:

1. A disk recording and reproducing device comprising:

storage means;

reproduction means for reading out data recorded in compressed form on a recordable disk and intermittently writing the read-out data into said storage means as disk read-out data at a first rate, during which time said reproduction means successively reads out the disk read-out data written in said storage means at a second rate lower than said first rate and expands the disk read-out data and then outputs the expanded disk read-out data as a reproduced data signal;

recording means for compressing data to be recorded and successively writing the compressed data into said storage means at said second rate, during which time said recording means intermittently reads out the compressed data written in said storage means to record the compressed read-out data onto said disk at said first rate; and control means for executing an editing mode to allow said recording means to record the compressed data onto the disk while causing said reproduction means to read out the data from the disk, wherein said control means alternately allows said reproduction means to read out the data from the disk and said recording means to record the compressed data onto the disk by shared use of said storage means between said reproduction means and recording means such that data to be supplied for reproduction and data to be supplied for recording coexist in said storage means, said control means also causing the compressed data to be sequentially stored at storage locations previously occupied by the data having been read out from said storage means and supplied for reproduction, and wherein when the stored data unread in said storage means are less than a predetermined amount, said control means preferentially allows said reproduction means to read out the data from the disk until the unread data in said storage means reaches the predetermined amount, and wherein when the stored data unread in said storage means has reached the predetermined amount, said control means controls said recording means to record said data to be recorded onto the disk by a predetermined unit amount.

2. A disk recording and reproducing device as defined in claim 1, wherein when access to the disk becomes impossible, said control means suspends both writing of the disk read-out data into said storage means and reading out of the compressed data from said storage means so as to continue reading out of the disk read-out data from said storage means and writing of the compressed data into said storage means and also performs a recovery operation to permit access to the disk, and wherein after access to the disk becomes possible, said control means resumes the writing of the disk read-out data into said storage means and the reading out of the compressed data from said storage means.

3. A disk recording and reproducing device comprising:

a single storage device;

a reproduction circuit that reads out data recorded in compressed form on a recordable disk and intermittently writes the read-out data into the single storage device as disk read-out data at a first rate, during which time the reproduction circuit successively reads out the disk read-out data written in the single storage device at a second rate lower than the first rate and expands the disk read-out data and then outputs the expanded disk read-out data as a reproduced data signal;

a recording circuit that compresses data to be recorded and successively writes the compressed data into the single storage device at the second rate, during which time the recording circuit intermittently reads out the compressed data written in the single storage device to record the compressed read-out data onto the disk at the first rate; and a control circuit that executes an editing mode to allow the recording circuit to record the compressed data onto the disk while causing the reproduction circuit to read out the data from the disk, wherein the control circuit alternately allows the reproduction circuit to read out the data from the disk and the recording means to record the compressed data onto the disk by shared use of the single storage device between the reproduction circuit and recording circuit such that data to be supplied for reproduction and data to be supplied for recording coexist in the single storage device, the control circuit also causes the compressed data to be sequentially stored at storage locations previously occupied by the data having been read out from the single storage device and supplied for reproduction, wherein when the stored data unread in the single storage device are less than a predetermined amount, the control circuit preferentially allows the reproduction circuit to read out the data from the disk until the unread data in the single storage device reaches the predetermined amount, and wherein when the stored data unread in the single storage device has reached the predetermined amount, the control circuit controls the recording circuit to record the data to be recorded onto the disk by a predetermined unit amount.

4. A disk recording and reproducing device as defined in claim 3, wherein when access to the disk becomes impossible, the control circuit suspends both writing of the disk read-out data into the single storage device and reading out of the compressed data from the single storage device to continue reading out of the disk read-out data from the single storage device and writing of the compressed data into the single storage device and also performs a recovery operation to permit access to the disk, and wherein after access to the disk becomes possible, the control circuit resumes the writing of the disk read-out data into the single storage device and the reading out of the compressed data from the single storage device.

* * * * *